(12) United States Patent
An et al.

(10) Patent No.: US 12,343,862 B2
(45) Date of Patent: Jul. 1, 2025

(54) MULTIDIMENSIONAL JOINT AND ROBOT

(71) Applicants: SHANGHAI FLEXIV ROBOTICS TECHNOLOGY CO., LTD., Shanghai (CN); FLEXIV LTD., Grand Cayman (GB)

(72) Inventors: Ran An, Santa Clara, CA (US); Juncai Peng, Shanghai (CN); Tingke Song, Shanghai (CN); Shiquan Wang, Shanghai (CN)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 0 days.

(21) Appl. No.: 18/272,947

(22) PCT Filed: Oct. 20, 2022

(86) PCT No.: PCT/CN2022/126362
§ 371 (c)(1),
(2) Date: Jul. 18, 2023

(87) PCT Pub. No.: WO2024/082206
PCT Pub. Date: Apr. 25, 2024

(65) Prior Publication Data
US 2024/0391116 A1  Nov. 28, 2024

(51) Int. Cl.
*B25J 17/02* (2006.01)
*B25J 9/10* (2006.01)
*B25J 13/08* (2006.01)

(52) U.S. Cl.
CPC .......... *B25J 17/0258* (2013.01); *B25J 9/102* (2013.01); *B25J 13/085* (2013.01)

(58) Field of Classification Search
CPC ....... B25J 13/085; B25J 9/102; B25J 17/0258
(Continued)

(56) References Cited

FOREIGN PATENT DOCUMENTS

| CN | 101486192 A | 7/2009 |
|----|-------------|--------|
| CN | 102211627 A | 10/2011 |

(Continued)

OTHER PUBLICATIONS

International Search Report and Written Opinion for International Application No. PCT/CN2022/126362 mailed Jun. 26, 2023.
(Continued)

*Primary Examiner* — T. Scott Fix
(74) *Attorney, Agent, or Firm* — Dorsey & Whitney LLP

(57) ABSTRACT

A multidimensional joint is provided and includes a body and a drive assembly. The body includes a first motor and a second motor. The drive assembly includes a planetary carrier rotatably coupled to the body, a first drive gear driveably coupled to the first motor, a second drive gear driveably coupled to the second motor, at least one driven gear and at least one output end. The first and the second drive gears are rotatably mounted on the planetary carrier about a first axis, and the at least one driven gear is rotatably mounted on the planetary carrier about a second axis in a different direction from the first axis. The first and the second drive gears are engaged with the at least one driven gear respectively. The at least one driven gear is coupled to the at least one output end configured to output torque to a load.

18 Claims, 6 Drawing Sheets

(58) Field of Classification Search
USPC .................................................. 74/490.06
See application file for complete search history.

(56) References Cited

FOREIGN PATENT DOCUMENTS

| | | |
|---|---|---|
| CN | 206614561 U | 11/2017 |
| CN | 206677985 U | 11/2017 |
| CN | 109866250 A | 6/2019 |
| CN | 110170988 A | 8/2019 |
| CN | 209970773 U | 1/2020 |
| CN | 111360868 A | 7/2020 |
| CN | 212421294 U | 1/2021 |
| CN | 214055331 U | 8/2021 |
| CN | 113843775 A | 12/2021 |
| CN | 114571497 A | 6/2022 |
| CN | 115107012 A | 9/2022 |
| JP | 2022153045 A | 10/2022 |

OTHER PUBLICATIONS

Office Action for Chinese Application No. 202211288524.6 mailed Feb. 23, 2025.

MULTIDIMENSIONAL JOINT AND ROBOT

CROSS-REFERENCE TO RELATED APPLICATIONS

This application is a U.S. National Stage of PCT International Application No. PCT/CN2022/126362, filed on Oct. 20, 2022, the contents of which is hereby incorporated by reference in their entireties.

TECHNICAL FIELD

The present disclosure relates to the field of robotics, particularly to a multidimensional joint and robot.

BACKGROUND

In some robot applications, a single joint capable of outputting multidimensional motions is required. For example, in a hydraulic bipedal robot, the hipbone joint of the bipedal bionic robot has a gimbal device similar to a human femur, and the robot relies on this gimbal device to enable the femur to output forces and motions in multiple directions. Due to the need to provide forces and rotations in multiple directions in a small space, high requirements are placed on the space design. One approach known to the applicant is to use a hydraulic pump to deliver high pressure oil to a small hydraulic cylinder at the hipbone to achieve rotation of the bionic femur by hydraulic pressure.

SUMMARY

Details of one or more embodiments of the present disclosure are set forth in the accompanying drawings and description below. Other features, objects, and advantages of the disclosure will become apparent from the description, the drawings, and the claims.

One aspect of present disclosure provides a multidimensional joint, which includes a body and a drive assembly. The body includes a first motor and a second motor located therein. The drive assembly includes a planetary carrier rotatably coupled to the body, a first drive gear driveably coupled to the first motor, a second drive gear driveably coupled to the second motor, at least one driven gear and at least one output end. The first drive gear and the second drive gear are rotatably mounted on the planetary carrier about a first axis, and the at least one driven gear is rotatably mounted on the planetary carrier about a second axis in a different direction from the first axis. The first drive gear and the second drive gear are engaged with the at least one driven gear respectively. The at least one driven gear is coupled to the at least one output end, and the at least one output end is configured to output torque to a load.

Another aspect of present disclosure provides a robot having a multidimensional joint. The multidimensional joint includes a body and a drive assembly. The body includes a first motor and a second motor located therein. The drive assembly includes a planetary carrier rotatably coupled to the body, a first drive gear driveably coupled to the first motor, a second drive gear driveably coupled to the second motor, at least one driven gear and at least one output end. The first drive gear and the second drive gear are rotatably mounted on the planetary carrier about a first axis, and the at least one driven gear is rotatably mounted on the planetary carrier about a second axis in a different direction from the first axis. The first drive gear and the second drive gear are engaged with the at least one driven gear respectively. The at least one driven gear is coupled to the at least one output end, and the at least one output end is configured to output torque to a load.

Details of one or more embodiments of the present disclosure are set forth in the accompanying drawings and description below. Other features, objects, and advantages of the disclosure will become apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

DETAILED DESCRIPTION

In order to make the above objects, features and advantages of the present disclosure more apparent and better understood, embodiments of the disclosure will be fully described hereinafter with reference to the drawings. Numerous specific details are set forth in the following description in order to facilitate thorough understanding of the present disclosure. However, the present disclosure can be implemented in many other ways different from those described herein, and a person skilled in the art can make similar modifications without departing from the application, and therefore, the present disclosure is not limited by the specific embodiments disclosed below.

The present disclosure provides a multidimensional joint and a robot having the multidimensional joint. The multidimensional joint includes a body and a drive assembly coupled to the body. The body includes a first motor and a second motor. The drive assembly includes a planetary carrier, a first drive gear, a second drive gear, at least one driven gear, and at least one output end. The planetary carrier is rotatably coupled to the body. The first drive gear and the second drive gear are rotatably mounted on the planetary carrier about a first axis, and the at least one driven gear is rotatably mounted on the planetary carrier about a second axis. The first axis and the second axis are located in different directions. The first drive gear is coupled to the first motor, and the second drive gear is coupled to the second motor. The first drive gear and the second drive gear are engaged with the at least one driven gear respectively. The at least one driven gear is coupled to the at least one output end. The output end is configured to output torque to a load.

The multidimensional joint of the present disclosure allows force or torque output by the first motor and the second motor to be output at a single point of the drive assembly, and through the gear configuration of the drive assembly, torque can be output in different directions to drive the load, realizing multiple degrees of freedom motions of the load at the point.

Figure 1:
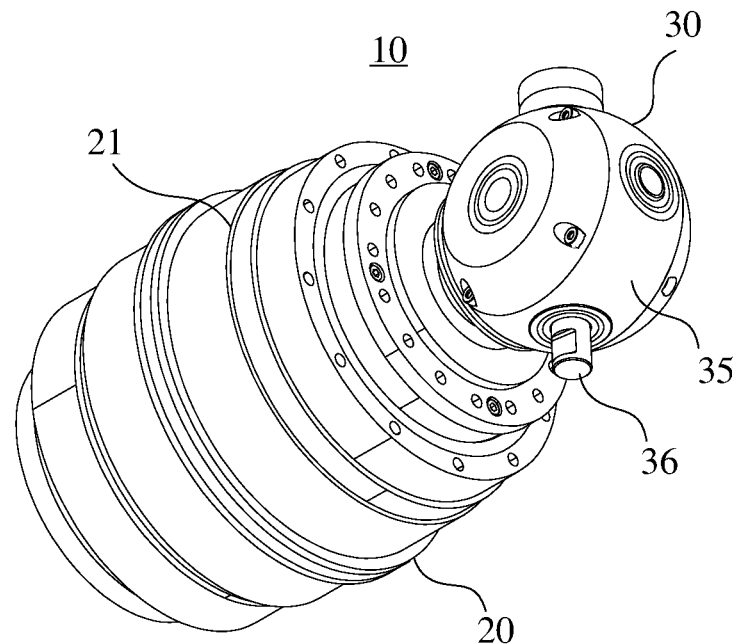
FIG. 1 is a schematic perspective view of a multidimensional joint according to an embodiment of the present disclosure.
Figure 2:
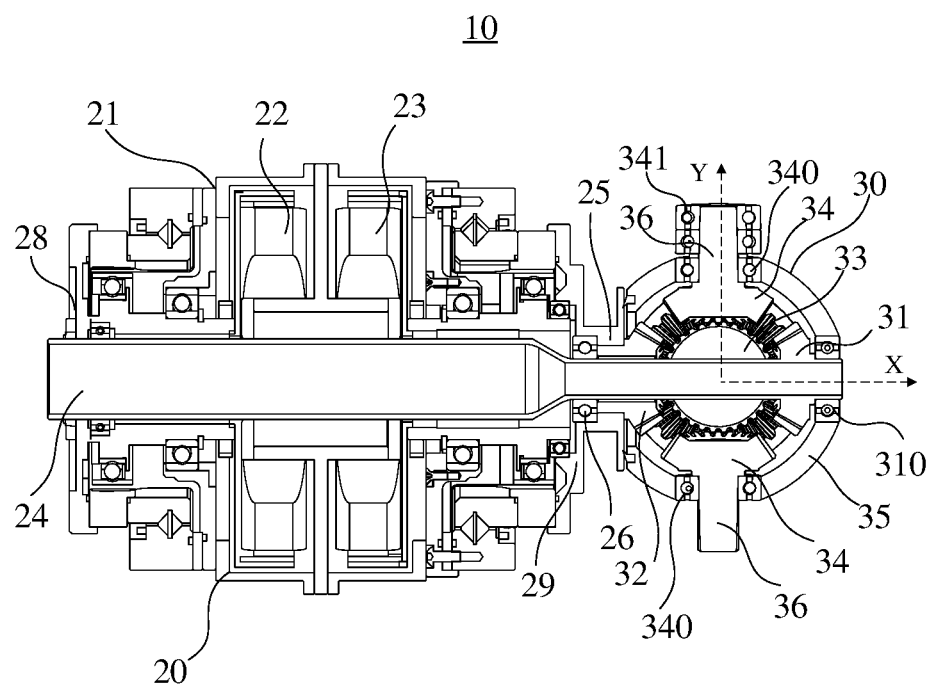
FIG. 2 is a schematic cross-sectional view of the multidimensional joint according to the embodiment shown in FIG. 1.

FIG. 1 is a schematic perspective view of a multidimensional joint 10 according to an embodiment of the present disclosure, and FIG. 2 is a schematic cross-sectional view of the multidimensional joint 10. Referring to FIGS. 1-2, the multidimensional joint 10 includes a body 20 and a drive assembly 30 coupled to the body 20. The body 20 includes a housing 21, a first motor 22 and a second motor 23 arranged side by side in the housing 21, and a drive mechanism that transmits force or torque output by the first motor 22 and the second motor 23 to the drive assembly 30. In this embodiment, the first motor 22 and the second motor 23 are located on the same side of the drive assembly 30 and have a common rotation axis, thereby realizing a compact structure.

Figure 3:
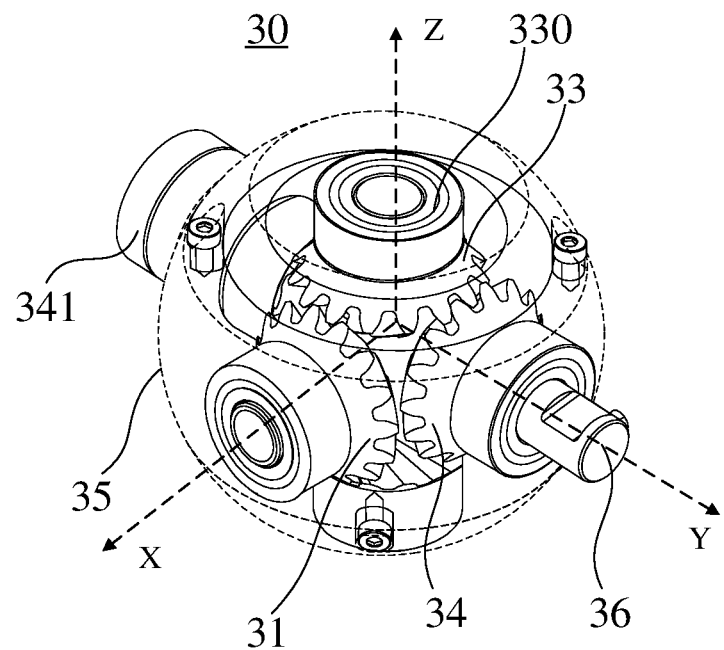
FIG. 3 is a schematic perspective view of a drive assembly according to the embodiment shown in FIG. 1.

Referring to FIGS. 2-3, in this embodiment, the drive assembly 30 includes a first drive gear 31, a second drive gear 32, a pair of driven gears 33, a pair of output gears 34, a planetary carrier 35, and output ends 36. In this embodiment, the planetary carrier 35 has an approximately spherical structure, and the gears 31, 32, 33, 34 are mounted on and rotatably coupled to the planetary carrier 35 through bearings. The first drive gear 31 and the second drive gear 32 have the same structure, i.e., the same number of teeth and the same module, and are located coaxially and oppositely arranged. The first motor 22 is driveably coupled to the first drive gear 31 to rotate the first drive gear 31 about the first axis, and the second motor 23 is driveably coupled to the second drive gear 32 to rotate the second drive gear 32 about the first axis too. The body 20 further includes a drive shaft 24 connecting the first motor 22 and the first drive gear 31, and a drive member 25 connecting the second motor 23 and the second drive gear 32. The drive shaft 24 passes through the second drive gear 32, and the drive member 25 is sleeved over the drive shaft 24 so that the drive shaft 24 and the drive member 25 are able to rotate asynchronously, while achieving a stable and compact structure. The drive shaft 24 has a hollow structure with internal space for accommodation of other components, such as wires. In some embodiments, a bearing is provided between the drive member 25 and the drive shaft 24 to provide stable support and impact transition between the drive shaft 24 and the drive member 25 in the radial direction of the drive shaft 24.

In the above embodiment, the first drive gear 31, the second drive gear 32, the pair of driven gears 33, and the pair of output gears 34 are all bevel gears each having a tooth side facing toward the center of the drive assembly 30. It will be understood that, in other embodiments, other appropriate gear structures may be used.

Figure 4:
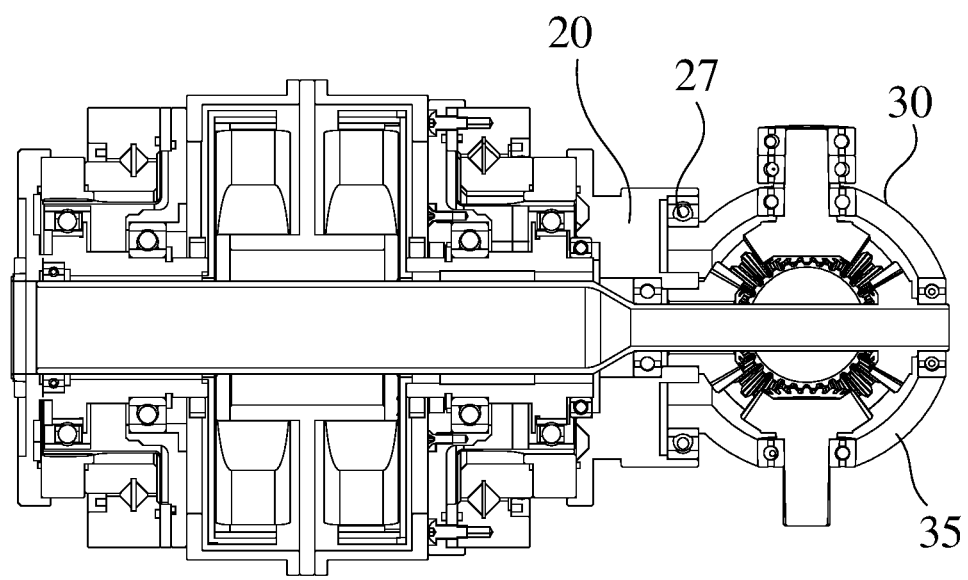
FIG. 4 is a schematic cross-sectional view of a multidimensional joint according to another embodiment of the present disclosure.

The first drive gear 31, the pair of driven gears 33, and the pair of output gears 34 are rotatably mounted on the planetary carrier 35 through a bearing 310, bearings 330, and bearings 340, respectively. In another embodiment shown in FIG. 4, a large bearing 27 is further provided between the planetary carrier 35 and the body 20 to further support the rotation of the drive assembly 30, while enabling the drive assembly 30 to effectively transfer external forces to the body 20 when subjected to external forces, thereby improving the stability and force-sensing capability of the structure.

With continued reference to FIGS. 2-3, in this embodiment, output ends 36 are positioned on a pair of output gears 34, respectively and project outside the planetary carrier 35 to be coupled to and output torque to the load. The driven gears 33 are coupled to the output ends 36 via the output gears 34, respectively. Depending on the actual requirements, the two output ends 36 can be configured accordingly. For example, in the embodiment shown in FIG. 2, one of the output ends 36 (i.e., the upper output end 36 in FIG. 2) is rotatably coupled to the load through a bearing 341 such that the torque output by this output end 36 about its rotation axis is not transmitted to the load, while the other output end 36 (i.e., the lower output 36 in FIG. 2) is fixedly coupled to the load to transmit the output torque about its rotation axis to the load. It will be understood that, in other embodiments, it may be necessary for both output ends 36 to simultaneously output torque about the rotation axes. For example, the two output ends are coupled to different loads, or to two separate parts of the same load. In such a case, the bearing 341 may be removed so that the output end 36 is directly coupled to the load. It will also be understood that in other embodiments, it may be sufficient to maintain only one output end.

The structure and principle of the drive assembly 30 will be described below in conjunction with a Cartesian coordinate system. Referring to FIG. 3, the X-axis of the coordinate system is co-axial with the drive shaft 24, i.e., coinciding with a first rotation axis about which the first drive gear 31 and the second drive gear 32 rotate. The pair of output gears 34 have the same structure, i.e., the same number of teeth and the same module, and are located coaxially and oppositely arranged. A second rotation axis about which the output gears 34 rotate coincides with the Y-axis of the coordinate system. The output gear 34 is the same as the drive gears 31 and 32 in number of teeth and module. The pair of driven gears 33 has the same structure, i.e., the same number of teeth and the same module, and are located coaxially and oppositely arranged. A third rotation axis about which the driven gears 33 rotate coincides with the Z-axis of the coordinate system. As a result, the rotation axis of the first drive gear 31 and the second drive gear 32, the rotation axis of the pair of driven gears 33, and the rotation axes of the pair of output gears 34 are perpendicular to one another and intersect at a point. In the X-direction, the pair of driven gears 33 are located between the pair of drive gears 31, 32 and are each simultaneously engaged with the pair of drive gears 31, 32. In the Z-direction, the pair of output gears 34 are located between the pair of driven gears 33 and are each simultaneously engaged with the pair of driven gears 33. It will be understood that, in other embodiments, by changing the position and structure of the gears, the rotation axes of the three sets of gears may not be perpendicular to each other. For example, only two of the rotation axes are perpendicular to each other. Similarly, the rotation axes of the three sets of gears may not intersect at a point. For example, only two of the rotation axes intersect at a point.

In the embodiment shown in FIGS. 1-3, the first drive gear 31 and the second drive gear 32 are each simultaneously engaged with a pair of driven gears 33, and the pair of driven gears 33 are each simultaneously engaged with a pair of output gears 34. The driven gears 33 are coupled to the output ends 36 through the output gears 34. Thus, different motion outputs at the drive assembly 30 can be achieved, depending on different combinations of the outputs of the first motor 22 and the second motor 23.

Taking an initial position of each component as the reference point of origin, and assuming that the rotation angle of the first drive gear 31 is $\alpha_1$, the rotation angle of the second drive gear 32 is $\alpha2$, the output angle of the drive assembly 30 about the X-axis is $\theta x$, and the output angle of the drive assembly 30 about the Y-axis is $\theta y$, based on the above structural configuration of the drive assembly 30, it can be derived that:

$$\theta x + \theta y = \alpha_1 \quad (1)$$

$$\theta x - \theta y = \alpha_2 \quad (2)$$

Since the motions of the drive gears 31, 32 and the output gears 34 are synchronized, the above Equations 1-2 also reflect the relationship between the rotational speeds of drive gears 31, 32 and the rotational speeds of the output gears 34 or the drive assembly 30.

Assuming that the output torque of the first drive gear 31 is $M_1$, the output torque of the second drive gear 32 is $M_2$, the output torque of the drive assembly 30 about the X-axis is Mx, and the output torque of the drive assembly 30 about the Y-axis is My, based on the above structural configuration of the drive assembly 30, it can be derived that:

$$Mx + My = 2M_1 \quad (3)$$

$$Mx - My = 2M_2 \quad (4)$$

As can be seen from the configuration of the drive assembly 30, the drive gears 31, 32, the planetary carrier 35 and the driven gears 33 together form a mechanism similar to a differential speed device, allowing two drive gears 31, 32 to rotate at different rotational speeds. Thus, in response to different output combinations of the pair of drive gears 31, 32, corresponding desired motion outputs at the output ends 36 can be achieved.

In combination with the input-output relationships for rotation angle, rotational speed and torque as described above, it will be understood that, depending on the different output combinations of the first motor 22 and the second motor 23, there are four main operating modes for the multidimensional joint 10.

In the first operating mode, the first motor 22 and the second motor 23 rotate in the same direction and at the same speed, and therefore, the first drive gear 31 and the second drive gear 32 also rotate in the same direction and at the same speed about the X-axis. Consequently, the driven gear 33 will not rotate about the Z-axis. In the case where output gears 34 are provided, the output gears 34, which are engaged with the driven gears 33 respectively, do not rotate about the Y-axis either. In sum, these gears 31, 32, 33, 34 do not move relatively, but rotate about the X-axis as a whole with the planetary carrier 35, and further drive the external load coupled to the output ends 36, such as a part of the robot, to rotate about the X-axis. The rotation angle of the load about the X-axis is the same as the rotation angle of the first drive gear 31 and the second drive gear 32, and the output torque of the drive assembly 30 about the X-axis is the sum of the output torques of the first drive gear 31 and the second drive gear 32.

In the second operating mode, the first motor 22 and the second motor 23 rotate at the same speed but in opposite directions, and thus drive the first drive gear 31 and the second drive gear 32 to rotate about the X-axis at the same speed and in opposite directions. As a result, the output gears 34 rotate about the Y-axis at the same speed and in the opposite directions, thereby driving the load to rotate about the Y-axis. Although the pair of output gears 34 rotate in opposite directions, one of the output ends 36 does not output torque about the Y-axis as it is rotatably coupled to the load through the bearing 341, and the other output end 36, which is fixedly coupled to the load, outputs torque to drive the load to rotate about the Y-axis. The rotation angle of the output gear 34 about the Y-axis is the same as the rotation angle of the first drive gear 31 and the second drive gear 32, and the output torque about the Y-axis is the sum of the output torque of the first drive gear 31 and the second drive gear 32. In addition, in this mode, the drive assembly 30 as a whole does not rotate about the X-axis because the first drive gear 31 and the second drive gear 32 rotate at the same speed and in opposite directions.

In the third operating mode, the first motor 22 and the second motor 23 rotate in the same direction but at different speeds. In this case, the first drive gear 31 and the second drive gear 32 rotate about the X-axis in the same direction but at different speeds, for example, the speed of the first drive gear 31 is greater than the speed of the second drive gear 32. In this case, on the one hand, the output gears 34 rotate about the Y-axis at the same speed and in opposite directions, while on the other hand, the drive assembly 30 as a whole rotates about the X-axis. In the direction about the Y-axis, as explained earlier, only one output end 36 outputs torque to drive the load to rotate about the Y-axis. In the direction about the X-axis, the two output ends 36 simultaneously output a torque to the load. Thus, the multidimensional joint 10 provides two dimensions of motion output, i.e., driving the rotations of the load about both the X-axis and Y-axis. According to Equations 1-4, the rotation angle of the drive assembly 30 about the X-axis is equal to half of the sum of the rotation angles of the first drive gear 31 and the second drive gear 32, the rotation angle about the Y-axis is half of the difference between the rotation angles of the first drive gear 31 and the second drive gear 32, the output torque about the X-axis is the sum of the output torques of the first drive gear 31 and the second drive gear 32, and the output torque about the Y-axis is the difference between the output torques of the first drive gear 31 and the second drive gear 32.

In the fourth operating mode, the first motor 22 and the second motor 23 rotate in opposite directions and at different speeds, and thus, the first drive gear 31 and the second drive gear 32 rotate about the X axis in opposite directions and at different speeds. Similar to the third operating mode, on the one hand, the pair of output gears 34 rotate about the Y-axis at the same speed and in opposite directions, and on the other hand, the drive assembly 30, as a whole, rotates about X-axis in the same direction as one of the first drive gear 31 and the second drive gear 32 which has a relatively larger rotation speed. Consequently, the multidimensional joint 10 provides two dimensions of motion output, i.e., driving the load to rotate about both the X-axis and Y-axis. The output angles and output torques of the drive assembly 30 can also be obtained by the above-described equations. Specifically, the output rotation angle of the drive assembly 30 about the X-axis is half of the difference between the rotation angles of the first drive gear 31 and the second drive gear 32, and the output rotation angle about the Y-axis is half of the sum of the rotation angles of the first drive gear 31 and the second drive gear 32. The output torque about the X-axis is the difference between the output torques of the first drive gear 31 and the second drive gear 32, and the output torque about the Y-axis is the sum of the output torques of the first drive gear 31 and the second drive gear 32.

In understanding the above equations and the calculation process in each mode, it should be noted that the parameters in the equations are vectors including directions, but in the following explanation of each mode, the described angles and torques represent only the magnitudes of the parameters for ease of understanding.

In the above embodiment, the drive assembly 30 is configured to include six gears, i.e., a pair of drive gears, a pair of driven gears and a pair of output gears, which thus provides stable support to the parts of the drive assembly 30 and facilitates even force transition and distribution, enabling the joint to have a better resistance to interference.

According to the structure of the drive assembly 30 of the above embodiment, a pair of output gears 34 are provided, one of which outputs a torque about the X-axis only, while serving to balance and stabilize the structure by cooperating with the driven gear 33. It will be understood that, in another embodiment, the output gear that does not output a torque about the Y-axis may be omitted. For example, the load is coupled directly to only one output gear, or for stabilization, the load is further rotatably coupled to a support rod provided on the planetary carrier 35 (which will be further described later with reference to FIG. 7). Similarly, in the above embodiment, a pair of driven gears 33 are provided so as to provide a stable engagement with the drive gears 31, 32 and the output gear 34. However, it will be understood that in other embodiments, only one driven gear may be used.

Figure 5:
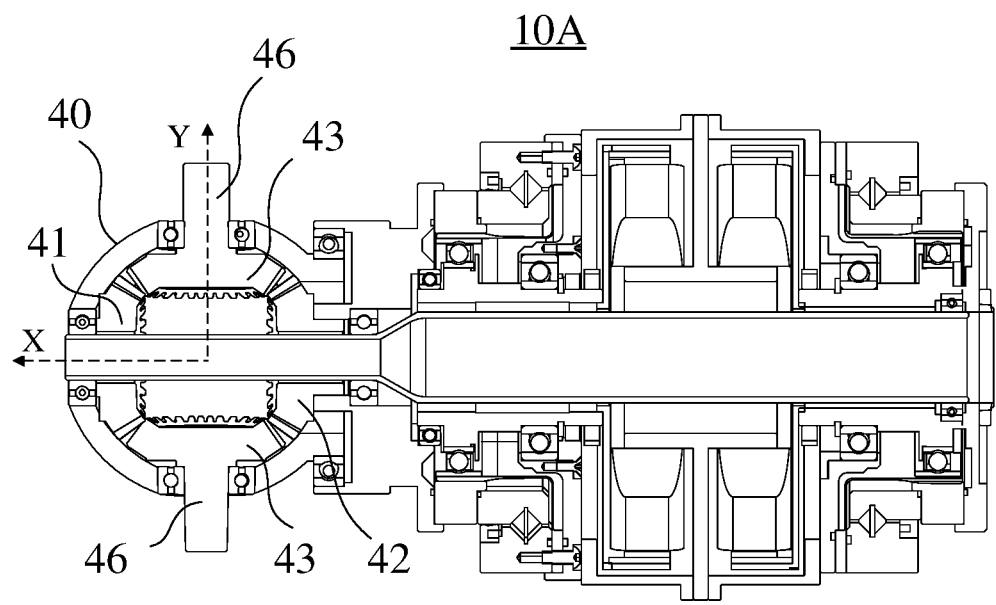
FIG. 5 is a schematic cross-sectional view of a multidimensional joint according to another embodiment of the present disclosure.
Figure 6:
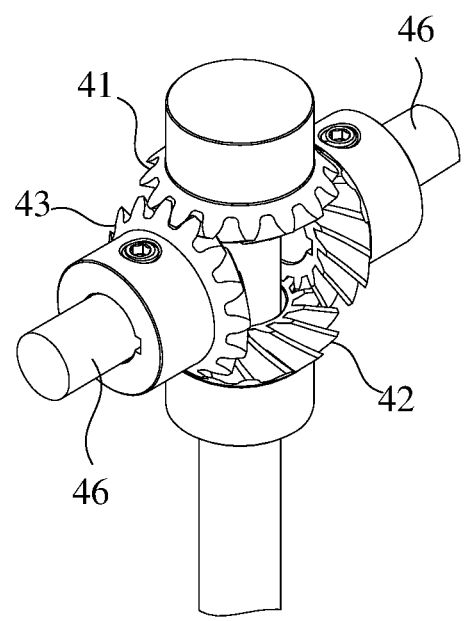
FIG. 6 is a schematic perspective view of a gear configuration inside the drive assembly according to the embodiment shown in FIG. 5.

FIG. 5 is a schematic cross-sectional view of a multidimensional joint 10A of another embodiment of the present disclosure, and FIG. 6 shows the gear configuration of the drive assembly 40. In this embodiment, the drive assembly 40 includes a first drive gear 41, a second drive gear 42, and a pair of driven gears 43. The first drive gear 41 and the second drive gear 42 have the same structure and are opposite to each other, and the pair of driven gears 43 are engaged with the first drive gear 41 and the second drive gear 42 respectively and simultaneously. The rotation axis of the drive gears 41, 42 are perpendicular to the rotation axis of the driven gears 43. In an embodiment, the number of teeth and the module of the drive gears 41, 42 are the same as those of the driven gears 43.

Compared to the previously described embodiment, no output gear is employed in this embodiment. output ends 46 are provided on and directly coupled to the driven gears 43, and coupled to the load so as to output torque to the load. Similar to the previously described embodiment, it is possible that only one output end 46 outputs torque about the Y-axis, while the other output end 46 is rotatably coupled to the load through a bearing.

Similarly, based on the gear configuration of the drive assembly 40, it may have the following multiple operating modes:

In the first operating mode, the first drive gear 41 and the second drive gear 42 rotate in the same direction and at the same speed about the X-axis, driving the drive assembly 40 to rotate about the X-axis to drive the load, and the pair of driven gears 43 do not rotate about the Y-axis.

In the second operating mode, the first drive gear 41 and the second drive gear 42 rotate about the X-axis at the same speed and in the opposite directions. As a result, the pair of driven gears 43 rotate about the Y-axis at the same speed and in the opposite directions to drive the load, and the drive assembly 40 as a whole does not rotate about the X-axis.

In the third operating mode, the first drive gear 41 and the second drive gear 42 rotate about the X-axis in the same direction but at different speeds. As a result, the pair of driven gears 43 rotate about the Y-axis at the same speed and in the opposite directions, and meanwhile, the drive assembly 40 as a whole rotates about the X-axis, thus driving the load in both directions.

In the fourth operating mode, the first drive gear 41 and the second drive gear 42 rotate about the X-axis in the opposite directions but at different speeds. Similar to the third operation mode, the pair of driven gears 43 rotate about the Y-axis in the opposite directions, and meanwhile, the drive assembly 40 as a whole rotates about the X-axis, thus driving the load in both directions.

Figure 7:
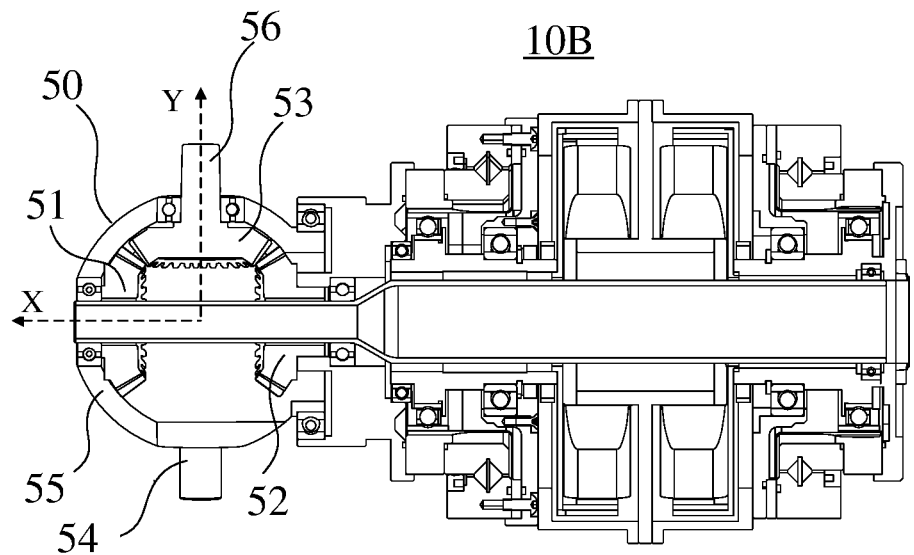
FIG. 7 is a schematic cross-sectional view of a multidimensional joint according to another embodiment of the present disclosure.
Figure 8:
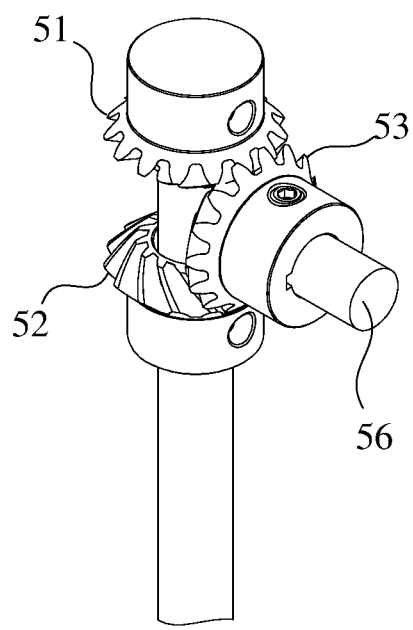
FIG. 8 is a schematic perspective view of a gear configuration inside the drive assembly according to the embodiment shown in FIG. 7.

FIG. 7 is a schematic cross-sectional view of a multidimensional joint 10B of another embodiment of the present disclosure, and FIG. 8 shows the gear configuration of the drive assembly 50 in this embodiment. In this embodiment, the drive assembly 50 includes a first drive gear 51, a second drive gear 52, and a driven gear 53 which is provided with an output end 56 coupled to the load. In contrast to the embodiment shown in FIG. 5 and FIG. 6, only one driven gear 53 is provided in this embodiment. Despite the difference, the working mechanism of the gears is similar to that of the embodiment shown in FIG. 5 and FIG. 6, and will not be further described here. To facilitate the stable connection to the load, a support rod 54 can be provided on the planetary carrier 55. The support rod 54 and the output end 56 are symmetrically distributed on opposite sides of the planetary carrier 55. The support rod 54 is rotatably coupled to the load in the direction about the Y-axis, so that only the torque about the X-axis is output to the load.

In the two embodiments shown in FIGS. 6-9, the drive gears, the driven gear(s) and the planetary carrier also form a mechanism similar to a differential speed device, and in response to different output combinations of the pair of drive gears, corresponding desired motion outputs of the drive assembly can be achieved. In addition, it will be understood that, based on the structure of the two embodiments of FIGS. 6-9, the Equations 1-4 describing the input-output relationships in terms of angle and torque, respectively, are also applicable to the multidimensional joints in the two embodiments shown in FIGS. 6-9, and will not be described in detail here.

Similar to the embodiment shown in FIGS. 1-4, in the two embodiments shown in FIGS. 6-9, the first drive gears 41, 51, the second drive gears 42, 52, and the driven gears 43, 53 are all bevel gears with their tooth sides facing toward the centers of the drive assemblies 40, 50, respectively. It will be understood that, in other embodiments, other suitable gear configurations may be used.

Figure 9:
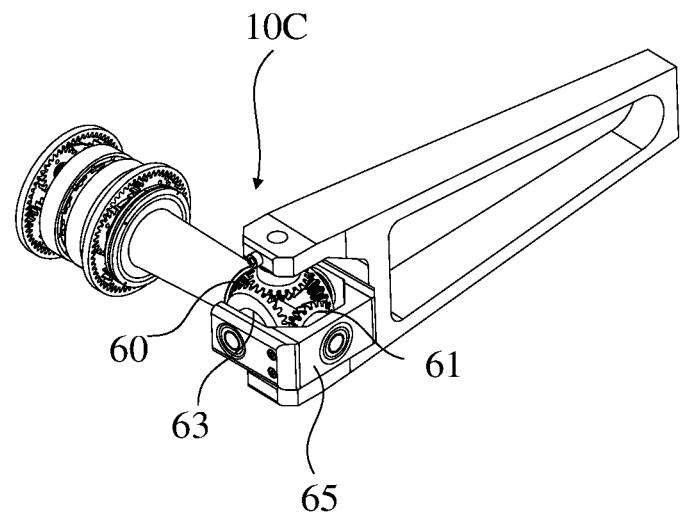
FIG. 9 is a schematic perspective view of a multidimensional joint according to another embodiment of the present disclosure.
Figure 10:
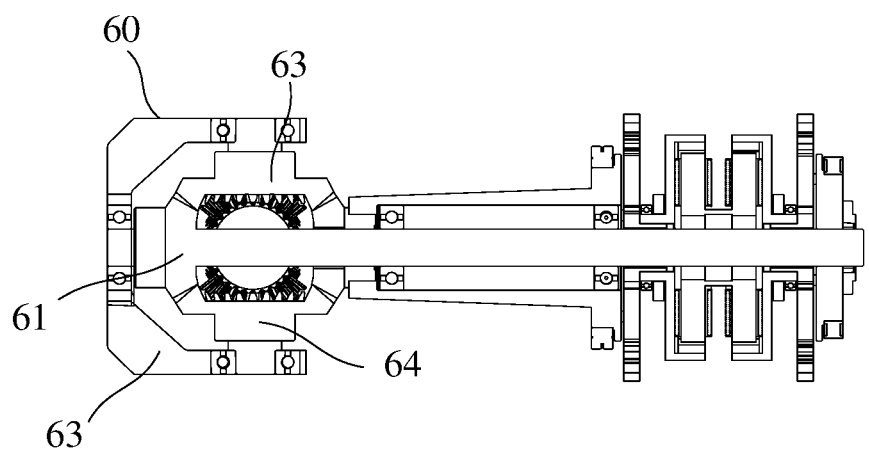
FIG. 10 is a schematic cross-sectional view of the multidimensional joint according to the embodiment shown in FIG. 9.

FIG. 9 is a schematic perspective view of a multidimensional joint 10C of another embodiment of the present disclosure, and FIG. 10 is a schematic cross-sectional view of the multidimensional joint 10C. This embodiment differs from the embodiment shown in FIGS. 1-3 in the structure of the planetary carrier. In this embodiment, the planetary carrier 65 of the drive assembly 60 has a U-shaped structure and is coupled to the first drive gear 61 and a pair of driven gears 63 to hold the same in the drive assembly 60. In the meantime, the planetary carrier 65 is rotatably coupled to the body through these gears and a drive mechanism. It will be understood that, in other embodiments, the planetary carrier may also be of other structures, such as a cuboidal structure, and form a differential speed device like mechanism together with the drive gears and driven gears.

With continued reference to FIG. 2, in applications where precise force control is required, additional force and torque sensors may be provided within the joint. For example, a first sensor 28 and a second sensor 29 are provided at each end of the housing 21 to detect the force and torque output by the first motor 22 and the second motor 23, respectively. The first sensor 28 and the second sensor 29 may be multiple degrees of freedom force and torque sensors, so as to detect forces and torques in multiple directions. Specifically, the first sensor 28 is provided between the first motor 22 and the drive shaft 24, and the second sensor 29 is provided between the second motor 23 and the drive member 25. By such a configuration, the first sensor 28 and the second sensor 29 can directly measure the output torques of the first motor 28 and the second motor 29 at any moment, and the output torque of the drive assembly of the multidimensional joint to the load at that moment can be further determined according to the aforementioned Equations 3-4. As such, it is possible to obtain precise output torque of the multidimensional joint, thereby enabling precise force control of the robot having the joint.

Based on the configurations of the drive assemblies according to embodiments described above, the output end(s) outputs a torque about the first axis and/or a torque about the second axis to the load, depending on the outputs of the first motor and the second motor. There may be only one torque about any one of the directions, or the two torques about both directions occur simultaneously, thus providing flexible and multidimensional motion outputs of the load.

This disclosure uses motors as a drive unit, and converts the rotations of two motors into motions in multiple directions by a differential speed device like mechanism composed of gears. The motions in multiple directions are concentrated and output at the drive assembly, thus enabling multiple degrees of freedom output in a limited space. Multiple degrees of freedom intersecting at one point is the optimal solution in terms of numerical model, and in this case it greatly facilitates the force control operation of the joints and the robot as a whole, for example.

Figure 11:
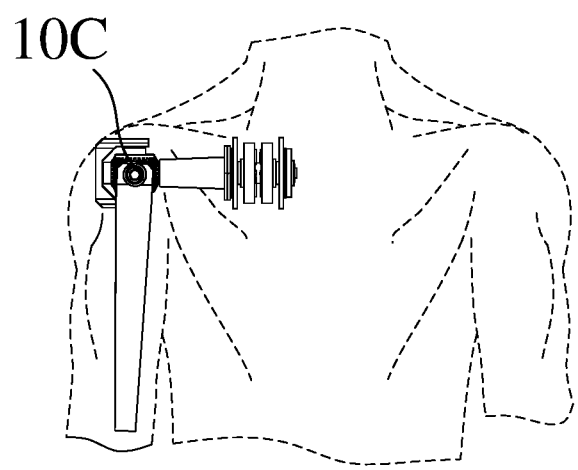
FIG. 11 is a schematic view of an application of a multidimensional joint according to an embodiment of the present disclosure.

Another aspect of the present disclosure provides a robot, which includes a multidimensional joint described in the above embodiments. The multidimensional joint can be applied at multiple structures of the robot, for example, when the robot is a humanoid robot, the multidimensional joint can be used as a shoulder joint or a hip joint. FIG. 11 illustrates an exemplary application of the multidimensional joint of the present disclosure, where the robot 100 includes a multidimensional joint 10C as a shoulder joint to drive an arm of the robot 100. It will be understood that the multidimensional joint of the present disclosure may also be used as other joints in the robot that require two degrees of freedom.

It will also be understood that, the multidimensional joints of the present disclosure can be used in other industrial products in addition to robots to provide multidimensional relative motions between two parts of the product.

The technical features in the above embodiments can be combined flexibly as needed. For brevity, not all possible combinations of the technical features in the above embodiments have been described, however, as long as these combinations of technical features do not contradict each other, they should be considered to fall with the scope of the specification.

The above described embodiments express only several embodiments of the present disclosure, and their descriptions are more specific and detailed, but they should not be construed as a limitation of the scope of the present disclosure. It should be noted that for those skilled in the art, a number of variations and improvements can be made without departing from the conception of the present disclosure, and these belong to the scope of present disclosure. Therefore, the scope of the present disclosure shall be subject to the attached claims.

What is claimed is:

1. A multidimensional joint, comprising:
a body comprising a first motor and a second motor located therein; and
a drive assembly, comprising a planetary carrier rotatably coupled to the body, a first drive gear driveably coupled to the first motor, a second drive gear driveably coupled to the second motor, at least one driven gear and at least one output end,
wherein the first drive gear and the second drive gear are rotatably mounted on the planetary carrier about a first axis, the at least one driven gear is rotatably mounted on the planetary carrier about a second axis, and the second axis is in a different direction from the first axis;
wherein the first drive gear and the second drive gear are engaged with the at least one driven gear respectively, the at least one driven gear is coupled to the at least one output end, and the at least one output end is configured to output torque to a load; and
wherein the multidimensional joint further comprises at least one output gear engaged with the at least one driven gear such that the at least one driven gear is coupled to the at least one output end through the at least one output gear, the at least one output gear being configured to rotate about a third axis, the third axis being in a different direction from the first axis and the second axis.

2. The multidimensional joint of claim 1, wherein the first motor and the second motor are located on the same side of the drive assembly, the first motor being coupled to the first drive gear through a drive shaft and the second motor being coupled to the second drive gear through a drive member; and
wherein the drive member has a hollow structure and the drive shaft passes through the drive member and the second drive gear to connect the first motor and the first drive gear.

3. The multidimensional joint of claim 1, further comprising a bearing provided between the drive member and the drive shaft.

4. The multidimensional joint of claim 1, wherein the first axis, the second axis, and the third axis are perpendicular to each other and intersect at a point.

5. The multidimensional joint of claim 1, wherein the at least one driven gear comprises a pair of driven gears oppositely arranged, and the at least one output gear comprises a pair of output gears oppositely arranged, the first drive gear, the second drive gear, the pair of driven gears and the pair of output gears being bevel gears each having a tooth side facing toward a center of the drive assembly.

6. The multidimensional joint of claim 5, wherein the at least one output end comprises two output ends, and the pair of output gears are each provided with one of the two output ends, one of the two output ends being rotatably coupled to the load through a bearing.

7. The multidimensional joint of claim 1, wherein the at least one output end is provided on the at least one driven gear.

8. The multidimensional joint of claim 7, wherein the at least one driven gear comprises a single driven gear, and the planetary carrier comprises a support rod symmetrically distributed with respect to the output end, the support rod being rotatably coupled to the load.

9. The multidimensional joint of claim 1, further comprising a bearing provided between the planetary carrier and the body to support rotation of the drive assembly.

10. The multidimensional joint of claim 1, further comprising a first sensor and a second sensor configured to detect torque output by the first motor and the second motor, respectively.

11. A robot having a multidimensional joint, wherein the multidimensional joint comprises:
a body comprising a first motor and a second motor located therein; and
a drive assembly, comprising a planetary carrier rotatably coupled to the body, a first drive gear driveably coupled to the first motor, a second drive gear driveably coupled to the second motor, at least one driven gear and at least one output end,
wherein the first drive gear and the second drive gear are rotatably mounted on the planetary carrier about a first axis, the at least one driven gear is rotatably mounted on the planetary carrier about a second axis, and the second axis is in a different direction from the first axis;
wherein the first drive gear and the second drive gear are engaged with the at least one driven gear respectively, the at least one driven gear is coupled to the at least one output end, and the at least one output end is configured to output torque to a load; and
wherein the multidimensional joint further comprises at least one output gear engaged with the at least one driven gear such that the at least one driven gear is coupled to the at least one output end through the at least one output gear, the at least one output gear being configured to rotate about a third axis, the third axis being in a different direction from the first axis and the second axis.

12. The robot of claim 11, wherein the first motor and the second motor are located on the same side of the drive assembly, the first motor being coupled to the first drive gear through a drive shaft and the second motor being coupled to the second drive gear through a drive member; and
wherein the drive member has a hollow structure and the drive shaft passes through the drive member and the second drive gear to connect the first motor and the first drive gear.

13. The robot of claim 11, further comprising a bearing provided between the drive member and the drive shaft.

14. The robot of claim 11, wherein the first axis, the second axis, and the third axis are perpendicular to each other and intersect at a point.

15. The robot of claim 11, wherein the at least one driven gear comprises a pair of driven gears oppositely arranged, and the at least one output gear comprises a pair of output gears oppositely arranged, the first drive gear, the second drive gear, the pair of driven gears and the pair of output gears being bevel gears each having a tooth side facing toward a center of the drive assembly.

16. The robot of claim 15, wherein the at least one output end comprises two output ends, and the pair of output gears are each provided with one of the two output ends, one of the two output ends being rotatably coupled to the load through a bearing.

17. The robot of claim 11, wherein the at least one output end is provided on the at least one driven gear.

18. The robot of claim 17, wherein the at least one driven gear comprises a single driven gear, and the planetary carrier comprises a support rod symmetrically distributed with respect to the output end, the support rod being rotatably coupled to the load.

* * * * *